(12) United States Patent
Wang et al.

(10) Patent No.: US 11,652,244 B2
(45) Date of Patent: May 16, 2023

(54) BATTERY MODULE AND APPARATUS

(71) Applicant: Contemporary Amperex Technology Co., Limited, Fujian (CN)

(72) Inventors: Xuguang Wang, Ningde (CN); Jihua Yao, Ningde (CN); Gen Cao, Ningde (CN); Yanyan Niu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/132,178

(22) Filed: Dec. 23, 2020

(65) Prior Publication Data

US 2021/0111444 A1 Apr. 15, 2021

Related U.S. Application Data

(63) Continuation of application No. PCT/CN2020/092180, filed on May 25, 2020.

(30) Foreign Application Priority Data

Jun. 28, 2019 (CN) .......................... 201910574476.9

(51) Int. Cl.
*H01M 10/48* (2006.01)
*H01M 50/519* (2021.01)
(Continued)

(52) U.S. Cl.
CPC ..... *H01M 10/486* (2013.01); *H01M 10/0481* (2013.01); *H01M 50/271* (2021.01);
(Continued)

(58) Field of Classification Search
CPC ............. H01M 10/425; H01M 50/209; H01M 50/271; H01M 50/503; H01M 50/505;
(Continued)

(56) References Cited

U.S. PATENT DOCUMENTS

2003/0223474 A1* 12/2003 Roepke .................... G01K 1/16
374/152
2005/0134232 A1* 6/2005 Yamamoto ............ H02J 7/0031
320/150
(Continued)

FOREIGN PATENT DOCUMENTS

CN 105122499 A 12/2015
CN 105321637 A 2/2016
(Continued)

OTHER PUBLICATIONS

Machine translation of Japanese Patent Publication No. 2008-304295, published Dec. 18, 2008. (Year: 2008).*
(Continued)

*Primary Examiner* — Stewart A Fraser
*Assistant Examiner* — Lilia Nedialkova
(74) *Attorney, Agent, or Firm* — Kilpatrick Townsend & Stockton LLP

(57) ABSTRACT

The present application discloses a battery module and an apparatus, which relates to the field of battery technology and is used for optimizing the structure of the battery module. The battery module includes a battery, a connecting piece, a wire harness board and a temperature collecting component. The battery includes an electrode terminal and a top cover. The connecting piece is fixed with the electrode terminal; the wire harness plate is arranged on the top outside of the top cover, and is provided with an installation part and an elastic pressing part. The temperature collecting component is installed in the installation part and is located between the wire harness plate and the top cover. Among them, the elastic pressing part abuts against the connecting piece, and the temperature collecting component abuts against the top cover.

12 Claims, 9 Drawing Sheets

(51) Int. Cl.
  *H01M 50/543* (2021.01)
  *H01M 50/503* (2021.01)
  *H01M 50/271* (2021.01)
  *H01M 10/04* (2006.01)
(52) U.S. Cl.
  CPC ....... *H01M 50/503* (2021.01); *H01M 50/519* (2021.01); *H01M 50/543* (2021.01)
(58) Field of Classification Search
  CPC .. H01M 50/519; H01M 50/543; H01M 50/58; H01M 10/0481; H01M 10/486; H01C 1/01; H01C 7/008; Y02E 60/10; Y02P 70/50
  See application file for complete search history.

(56) References Cited

U.S. PATENT DOCUMENTS

| | | | |
|---|---|---|---|
| 2014/0017533 A1* | 1/2014 | Nishihara | H01M 50/172 429/93 |
| 2015/0079437 A1* | 3/2015 | Jeong | H01M 50/20 429/90 |

FOREIGN PATENT DOCUMENTS

| | | |
|---|---|---|
| CN | 206471435 U | 9/2017 |
| CN | 207116634 U | 3/2018 |
| CN | 108112274 A | 6/2018 |
| CN | 108206248 A | 6/2018 |
| CN | 207558994 U | 6/2018 |
| CN | 207779574 U | 8/2018 |
| JP | 2008-304295 A | 12/2008 |
| JP | 2017-98171 A | 6/2017 |
| WO | 2012075948 A1 | 6/2012 |

OTHER PUBLICATIONS

Search Report dated Aug. 13, 2020 in corresponding International Application No. PCT/CN2020/092180; 5 pages.
Written Opinion dated Aug. 13, 2020 in corresponding International Application No. PCT/CN2020/092180; 9 pages.
Office Action dated Jun. 4, 2021, in connection with corresponding Chinese Application No. 201910574476.9 (7 pp., including machine-generated English translation).
Extended European Search Report dated Sep. 24, 2021, in connection with corresponding European Application No. 20824063.0; 9 pages.
First search report received in the corresponding Chinese application 2019105/44769.
English translation of International Search Report received in the corresponding International Application PCT/CN2020/092180.

* cited by examiner

BATTERY MODULE AND APPARATUS

CROSS-REFERENCE TO RELATED APPLICATIONS

This application is a continuation of International Application No. PCT/CN2020/092180, filed on May 25, 2020, which claims priority to Chinese Patent Application No. 201910574476.9, which was filed with China National Intellectual Property Administration on Jun. 28, 2019 and titled "BATTERY MODULE". Both of the aforementioned applications are hereby incorporated by reference in their entireties.

TECHNICAL FIELD

The present application relates to the field of battery technology and, in particular, to a battery module and an apparatus.

BACKGROUND

The normal working temperature of the battery module is between −30° C. and 55° C. If the limit temperature is exceeded, the battery module will limit discharge power to achieve the safety protection of the battery module.

In the related technology, the battery module uses the following ways to collect the temperature: the temperature of the connecting piece is collected by the thermistor set on the flexible circuit board, and the temperature of the connecting pieces is used as the internal temperature of the battery. In the actual situation, the temperature of the connecting piece is higher than the internal temperature of the battery. If the difference between the two is large, the battery will limit the power in advance, which will affect the performance of the battery module.

At present, the vehicle manufacturers in the industry are developing in the direction of coupe models, and the traditional refitted electric vehicle should also reflect the advantages and characteristic of fast acceleration of electric vehicle. Therefore, the demand for the rapid acceleration condition will become more common, and the power requirement for battery module will become higher.

The inventor found that at least the following problems exist in the prior art: due to the limitation of the internal space size of the battery module, and considering the influence of manufacturing and cost, the width and thickness of the connecting piece cannot be very large. Under the low power condition, such as 1C discharge, the temperature of the connecting piece is close to the internal temperature of the battery. However, if a higher discharge rate is used, the temperature of the connecting piece is much higher than the internal temperature of the battery. Under the high power condition, due to the limitation of the over-current area of the connecting piece, the temperature of the connecting piece will rise sharply, while the internal temperature of the battery rise slowly, and the temperature difference between the two is huge, which will cause the battery module to limit the power in advance, thereby affecting the discharge power of the battery module. Therefore, how to detect the internal temperature of the battery is an urgent technical problem to be solved in the industry.

SUMMARY

The present application provides a battery module and an apparatus for optimizing the structure of the battery module.

An embodiment of the present application provides a battery module, including: a battery, including an electrode terminal and a top cover; a connecting piece, fixed with the electrode terminal; a wire harness plate, arranged on the top outside of the top cover, provided with an installation part and an elastic pressing part; and a temperature collecting component, installed on the installation part, and located between the wire harness plate and the top cover; where the elastic pressing part is butted with the connecting piece, and the temperature collecting component is butted with the top cover.

In some embodiments, the temperature collecting component includes a thermistor and a heat conduction pad, the thermistor is interposed between the installation part and the heat conduction pad, and the heat conduction pad is butted with the top cover.

In some embodiments, the elastic pressing part includes: a cantilever, the cantilever extending toward both sides of the installation part, and L1 is greater than L2; where L1 is the maximum distance between the surface of the cantilever on the side away from the top cover and the surface of the top cover on the side facing the installation part, L2 is the maximum distance between the surface of the installation part on the side away from one side of the top cover and the surface of the top cover on the side facing the installation part.

In some embodiments, the cantilever is constructed for whole arc bending.

In some embodiments, there are two cantilevers, and the two cantilevers are symmetrically arranged with respect to a center line in a width direction of the installation part.

In some embodiments, the installation part is provided with an installation slot and a buckle structure, one end of the thermistor is installed in the installation slot, and the other end of the thermistor is fixed by the buckle structure.

In some embodiments, the installation part includes is provided with a positioning slot, and the positioning slot is communicated with the installation slot, and the heat conduction pad is installed in the positioning slot.

In some embodiments, the connecting piece is configured to press the cantilever of the elastic pressing part, so that the temperature collecting component is clamped between the installation part and the top cover.

In some embodiments, the battery module further includes a circuit board, the circuit board is arranged on the wire harness plate, and the thermistor is electrically connected with the circuit board.

In some embodiments, the thermistor is connected to a connector plug, the circuit board is provided with a connector socket, the connector plug is plugged with the connector socket so that the thermistor is electrically connected to the circuit board.

In some embodiments, the temperature collecting component is arranged adjacent to the negative electrode terminal of the battery.

In the battery module provided by the above technical solution, the temperature collecting component is installed in the installation part of the wire harness plate, and the temperature collecting component is directly abutted against the top cover of the battery. The temperature of the top cover is more consistent with the internal temperature of the battery, and the top cover can reflect the change and height of the internal temperature of the battery in time. If the internal temperature of the battery rises, the temperature of the top cover rises in time. If the internal temperature of the battery decreases, the temperature of the top cover decreases in time. The temperature of the top cover changes in time with the change of the internal temperature of the battery.

The embodiment of the present application provides an apparatus including the battery module in the above embodiment, the battery module is configured to provide electric energy.

The battery module and the apparatus provided by the above technical solution, and the temperature transfer path of the battery module is: the internal temperature of the battery is transferred to the top cover, and the temperature of the top cover is transferred directly to the temperature collecting component. The temperature collecting component transfers the collected temperature to the circuit board or other components for follow-up analysis, processing and judgment. From the above temperature transfer path, it can be seen that the battery module provided by the above technical solution has short temperature transfer path and fast temperature response speed when collecting the internal temperature of the battery, which makes the control more accurate in the follow-up processing based on the collected temperature, thus the occurrence of the power limit of the battery module in advance could be effectively reduced or even be avoided, so that the efficiency of the battery module can be brought into full play. The structure and performance of the battery module can be effectively optimized, the performance of the vehicle equipment using the battery module is optimized, and the reliability of the vehicle equipment is increased.

DETAILED DESCRIPTION

Figure 1:
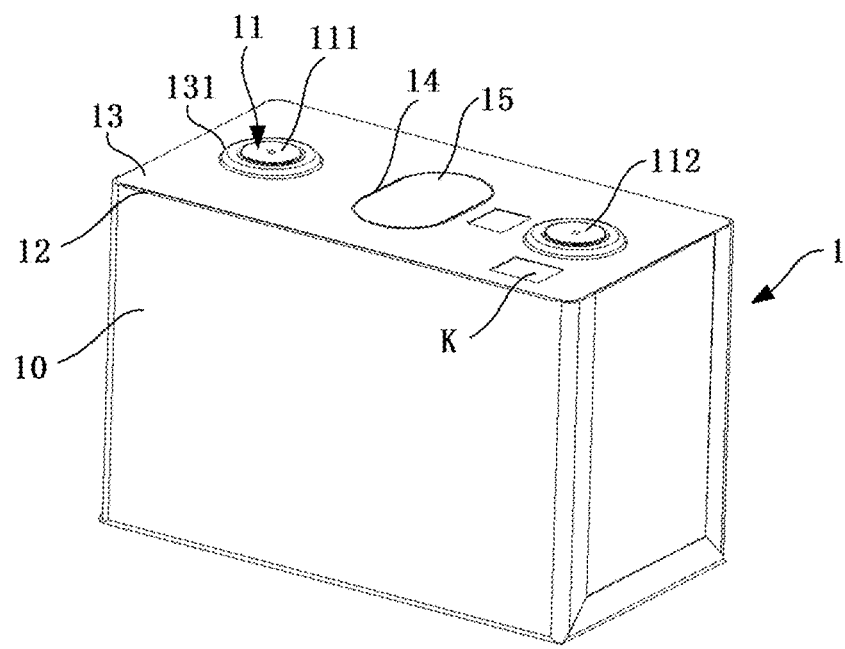
FIG. 1 is a schematic diagram of the battery three-dimensional structure of the battery module provided by an embodiment of the present application.
Figure 2:
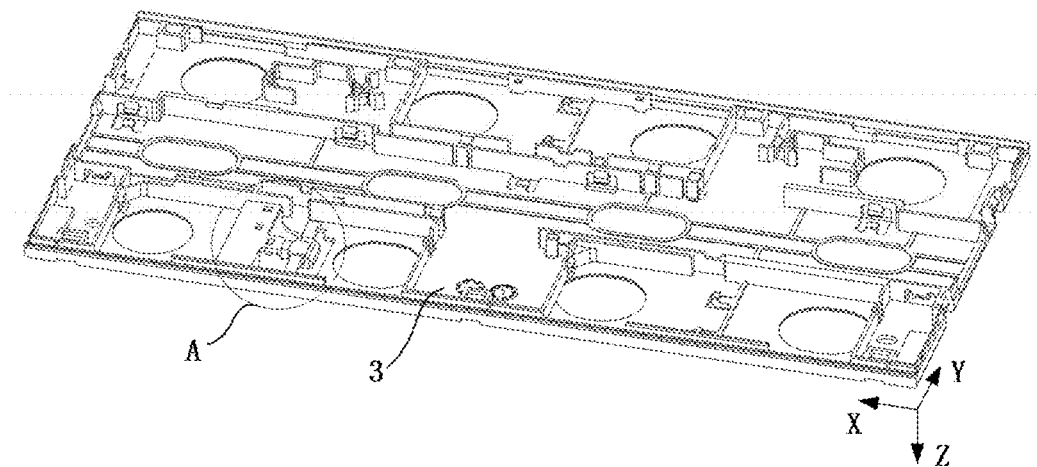
FIG. 2 is a schematic diagram of the structure of the wire harness plate of the battery module provided by an embodiment of the present application.

The technical solution of the present application is hereinafter described in detail with reference to the FIG. 1-FIG. 15.

Referring to FIG. 1 to FIG. 10, the embodiment of the present application provides a battery module, including: a battery 1, a connecting piece 2, a wire harness plate 3 and a temperature collecting component 4. The battery 1 includes an electrode terminal 11 and a top cover 12. The connecting piece 2 is fixed to the electrode terminal 11. The wire harness plate 3 is arranged on the top outside of the top cover 12, and the wire harness plate 3 is provided with an installation part 31 and an elastic pressing part 32. The temperature collecting component 4 is installed in the installation part 31 and is located between the wire harness plate 3 and the top cover 12. Among them, the elastic pressing part 32 is butted with the connecting piece 2, and the temperature collecting component 4 is butted with the top cover 12.

The following details the optional structure of each component and the connection relationship between each other.

Referring to FIG. 1, the optional structure of the battery 1 is as follows: The battery 1 includes a housing 10, an electrode component (not shown in the figure) arranged inside the housing 10, a top cover 12 arranged on the top of the electrode component, an electrode terminal 11 arranged on the top cover 12, and a top patch 13 arranged on the top of the top cover 12. Specifically, the top patch 13 is pasted to the top of the top cover 12. The top patch 13 is provided with an explosion-proof hole 14, and an explosion-proof valve 15 is installed in the explosion-proof hole 14. The top patch 13 is also provided with two electrode terminal through holes 131, each of which is provided with an electrode terminal 11, the electrode terminal 11 includes a positive electrode terminal 111 and a negative electrode terminal 112. That is, one electrode terminal through hole 131 is installed with a positive electrode terminal 111 inside, and the other electrode terminal 131 is provided with a negative electrode terminal 112 inside.

The material of the top patch 13 is, for example, insulation material. The top patch 13 is sheet-shaped and its size matches the top surface size of the top cover 12. For example, the structure and size of the top patch 13 just completely cover the top surface of the top cover 12; or, the size of the top patch 13 is slightly larger than the top surface size of the top cover 12, so that the top patch 13 has enough size to form a bending edge to cover the top cover 12.

On the one hand, the top patch 13 plays the role of insulation, preventing the top cover 12 from being short-connected with the external line. On the other hand, the top patch 13 also protects the top cover 12 from being scratched.

According to the different manufacturing methods of the electrode assembly, the battery 1 is classified as laminated battery or winding battery. In the laminated battery, the positive pole piece, the negative pole piece and the diaphragm are cut into specified sizes, and then the positive pole piece, the diaphragm and the negative pole piece are laminated into a battery. The wound battery is formed by winding the positive pole piece, the negative pole piece and the diaphragm.

The connecting piece 2 is arranged on the wire harness plate 3, and the connecting piece 2 is fixed with the electrode terminal 11. The connecting piece 2 and the electrode terminal 11 are fixed by welding or other fixing methods.

With the above-mentioned installation structure, the direct abutting contact between the temperature collecting component 4 and the top cover 12 can be realized without setting extra bolts or other connecting fasteners. The temperature collecting component 4 is directly abutted with the top cover 12, which on the one hand makes the structure of the whole battery module more compact; on the other hand, the temperature collecting path of the temperature collection component 4 is very short.

Specifically, the temperature collecting path using the above structure is as follows: the internal temperature of the battery 1 is transferred to the top cover 12, and the temperature of the top cover 12 is directly transferred to the temperature collecting component 4, thus completing the collection of the internal temperature of the battery 1. The temperature collecting component 4 transfers the collected temperature to the circuit board 5 or other components introduced later for follow-up analysis, processing and judgment.

From the above temperature transfer path, it can be seen that the battery module provided by the above technical solution has short temperature transfer path and fast temperature response when collecting the internal temperature of the battery 1, which makes the control more accurate in the follow-up processing based on the collected temperature, thus the occurrence of the power limit of the battery module in advance could be effectively reduced or even be avoided, so that the efficiency of the battery module can be brought into full play. The structure and performance of the battery module can be effectively optimized, the performance of the vehicle equipment using the battery module is optimized, and the reliability of the vehicle equipment is increased.

The specific implementation of the temperature collecting component 4 will be described below.

Referring to FIGS. 7 to 10, in some embodiments, the temperature collecting component 4 includes a thermistor 41 and a heat conduction pad 42. The thermistor 41 is interposed between the installation part 31 and the heat conduction pad 42, and the heat conduction pad 42 is butted with the top cover 12.

The heat conduction pad 42 is directly contact with the top cover 12, so the temperature of the top cover 12 can be accurately transferred to the thermistor 41 of the temperature collecting component 4. The size, thickness, material and shape of the heat conduction pad 42 are suitable to meet the installation requirements, and the installation part 31, the thermistor 41 and the heat conduction pad 42 should be in close contact. The close contact of the three mentioned above makes the heat transfer more reliable, avoids the air heat transfer caused by the gap caused by the non-contact of the components, and avoids the inaccurate temperature collecting caused by the air heat transfer, so that the temperature collection of the thermistor 41 is more accurate, which can more truly reflect the temperature of the top cover 12, and further accurately reflect the internal temperature of the battery 1.

The thermistor 41 of the temperature collecting component 4 may be a chip type NTC (negative temperature coefficient) temperature sensor or a water dropper type NTC temperature sensor.

In some embodiments, the thermistor 41 selects the water dropper type NTC temperature sensor. The water dropper type NTC temperature sensor includes a head and a wire connected to the head, and the head is in the shape of a water drop, so it can also be called a water dropper head or an end. The water dropper head is interposed between the installation part 31 and the heat conduction pad 42. One an end of the wire near the head is fixed by the buckle structure 34 described later to ensure a reliable connection of the wire.

The internal temperature of the battery 1 is directly transferred to the top cover 12, the temperature of the top cover 12 is directly transferred to the heat conduction pad 42, which transfers the temperature directly to the water dropper head, the water dropper head collects the temperature and then transfers the collected temperature to the subsequent circuit board 5 through wires. The electrical connection mode between the thermistor 41 and the circuit board 5 will be described in detail later.

Referring to FIG. 1, in some embodiments, the temperature collecting component 4 is disposed adjacent to the negative electrode terminal 112 of the battery 1. Specifically, the heat conduction pad 42 of the temperature collecting component 4 and the end of the thermistor 41 are arranged adjacent to the negative electrode terminal 112 of the battery 1.

Specifically, the above temperature collecting component 4 may be arranged anywhere around the negative electrode terminal 112. However, considering the installation of other components, the installation space and installation convenience of the temperature collecting module 4 itself, in an implementation, the temperature collecting component 4 is arranged on either side of the negative electrode terminal 112 on both sides of the battery 1 in the width direction, as shown in FIG. 1, the position of the opening K. The width direction of the battery 1 above refers to the direction located in the plane of the top plane of the top patch 13 and perpendicular to the center line of the positive electrode terminal 111 and the negative terminal 112.

Referring to FIG. 1, the specific installation structure at the opening K will be described below.

Referring to FIG. 1, specifically, the top patch 13 is provided with an opening K near the negative electrode terminal 112, and the top cover 12 is located on the bottom outside of the top patch 13, the above opening K causes a portion of the top cover 12 to be exposed. The heat conduction pad 42 is installed in the opening K. In particular, the heat conduction pad 42 is glued to the side wall of the opening K, or the heat conduction pad 42 is pasted and fixed directly with the top cover 12, or the heat conduction pad 42 is directly attached to the top cover 12 at the position corresponding to the opening K without using glue. Some embodiments will be given later to introduce the specific installation mode of the heat conduction pad 42 in detail. After the heat conduction pad 42 is installed in place, it is in close contact with the top cover 12. Since the heat conduction pad 42 is made of a heat conduction material, the heat conduction pad 42 can transfer the temperature of the top cover 12 to the thermistor 41, and then to the circuit board 5 described later via the thermistor 41, thereby realizing the temperature collection of the top cover 12.

The temperature at the top cover 12 near the negative electrode terminal 112 is closer to the real internal temperature of the battery 1, and the temperature difference between them under adverse working conditions is less than 5° C. With the above structure, the temperature transfer path is as follows: the internal temperature of the battery 1 is transferred to the top cover 12; the top cover 12 is provided with the heat conduction pad 42 near the negative electrode terminal 112, so the temperature of the top cover 12 near the negative electrode terminal 112 is transferred to the heat conduction pad 42 and then to the thermistor 41. Therefore, the temperature collected by the thermistor 41 can more accurately reflect the internal temperature of the battery 1. With the above technical solution, even if the battery module works under bad working conditions, the error between the temperature collected by the thermistor 41 and the internal temperature of the battery 1 is relatively small, and the collected temperature is accurate and the response is fast.

From the above analysis, it can be seen that the above technical solution adopting the embodiment of the present application has the following beneficial technical effects:

1. the temperature of the top cover 12 is collected and transferred by the thermistor 41. Since the top cover 12 is in direct contact with the temperature collecting component 4, the temperature of the top cover 12 is transferred directly to the heat conduction pad 42, then to the thermistor 41, and then collected by the circuit board 5. The temperature collected by the above structure is the temperature of the top cover 12, the temperature collected by the thermistor 41 is more consistent with the internal temperature of the battery 1, so that the collected temperature value is accurate.

2. compact structure and reliable performance. The elastic pressing part 32 of the wire harness plate 3 is pressed by the connecting piece 2 to realize the close contact between the temperature collecting component 4 and the top cover 12 without other special assembly, thus avoiding the complex structure and installation of the battery module caused by setting the connecting parts; it also avoids the temperature collection failure of the battery module caused by the damage of the connecting part itself and the unreliable connection and so on. The structure of the battery module is optimized, which makes the structure of the battery module more compact and the performance more reliable.

3. quick response of the temperature collection. The internal temperature change of the battery 1 can be transferred to the top cover 12 in time, and then to the heat conduction pad 42 and the thermistor 41 in time. The above-mentioned temperature collection path is very short, so the response speed is fast.

4. accurate and reliable temperature collection. Due to the use of the elastic pressing part 32 to press the thermistor 41 with the top cover 12, the butting contact between the thermistor 41 and the top cover 12 is more closely and reliably under the action of the elastic force of the elastic pressing part 32. Therefore, the stability and long-term reliability of the contact between the thermistor 41 and the top cover 12 are improved, and the contact between the thermistor 41 and the top cover 12 can be ensured under various shock or vibration conditions, so the temperature acquisition of thermistor 41 is accurate and reliable under various shock, vibration or other severe conditions.

The specific implementation of the elastic pressing part 32 will be described below.

Figure 3:
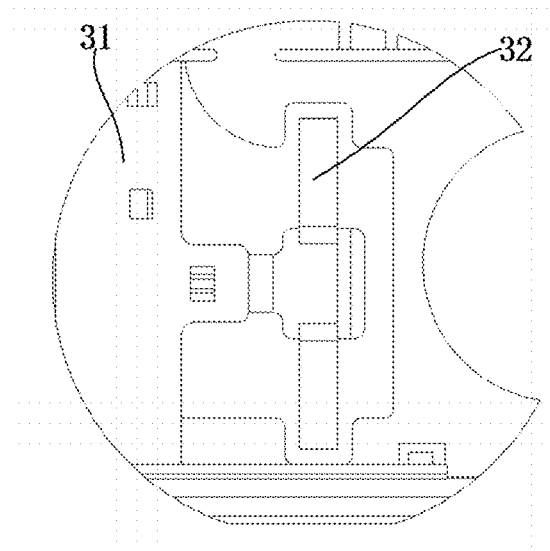
FIG. 3 is a top view of the local magnification of the wire harness plate in FIG. 2 at A.
Figure 4:
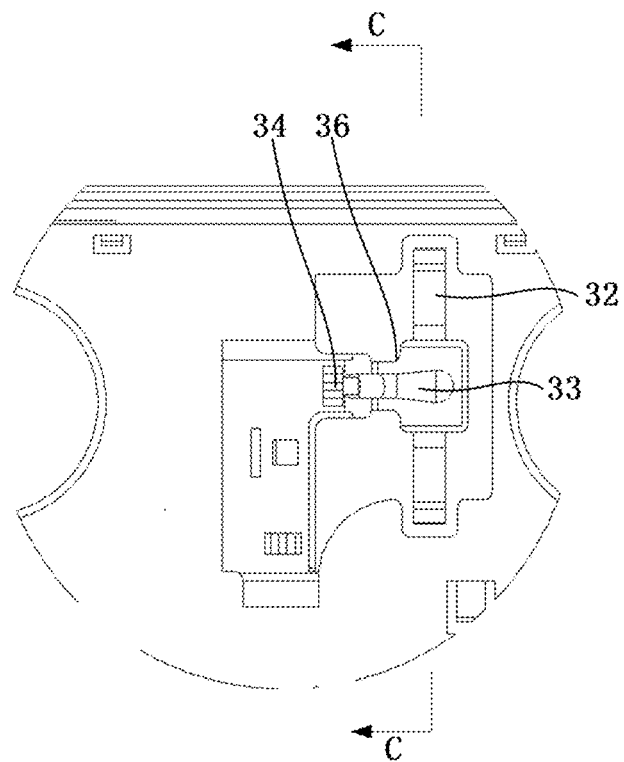
FIG. 4 is a bottom view of the local magnification of the wire harness plate in FIG. 2 at A.
Figure 5:
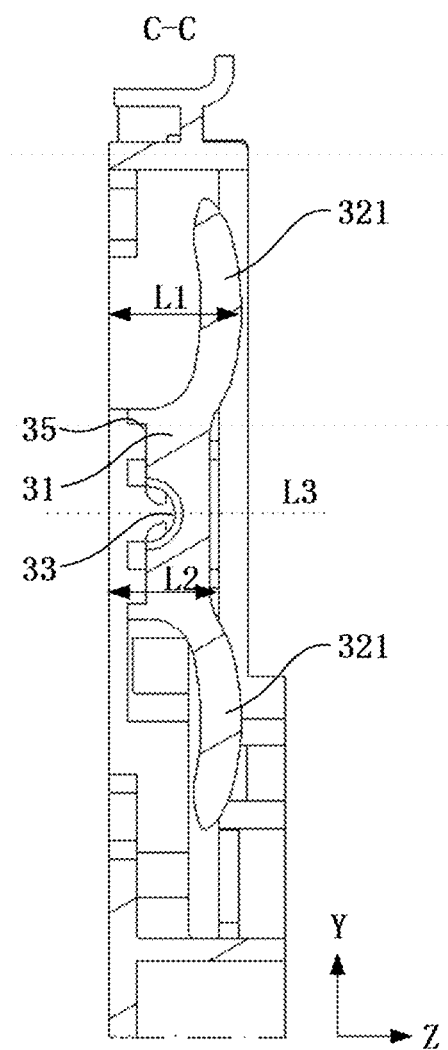
FIG. 5 is a schematic cross-sectional view of FIG. 4 at C-C.

Refer to FIGS. 3 to 5, in some embodiments, the elastic pressing part 32 includes a cantilever 321, the cantilever 321 extends toward both sides of the installation part 31, and L1 is greater than L2. Among them, L1 is the maximum distance between the surface of the cantilever 31 on the side away from the top cover 12 and the surface of the top cover 12 on the side facing the installation part 31, and this distance can also be called the height of cantilever 321. L2 is the maximum distance between the surface of the installation part 31 on the side away from one side of the top cover 12 and the surface of the top cover 12 on the side facing the installation part 31, and this distance can also be called the height of installation part 31.

Since the connecting piece 2 is fixedly connected to the electrode terminal 11, the distance between the mounting space defined by the connecting piece 2 and the top cover 12 is basically determined. In this installation space, the higher the height of the cantilever 321, the greater the degree of extrusion deformation of the cantilever 321 after installation, and the greater the pressure on the elastic pressing part 32 as a whole, so the greater the pressure on the thermistor 41 pressed by the installation 31. On the contrary, the pressure applied to the thermistor 41 is also smaller. Therefore, the height of the cantilever 321 can be designed according to the required installation pressure of the thermistor 41, so as to balance the reliable installation of the thermistor 41, and prevent the thermistor 41 from being crushed by excessive pressure, thus affecting the temperature collecting performance.

Figure 10:
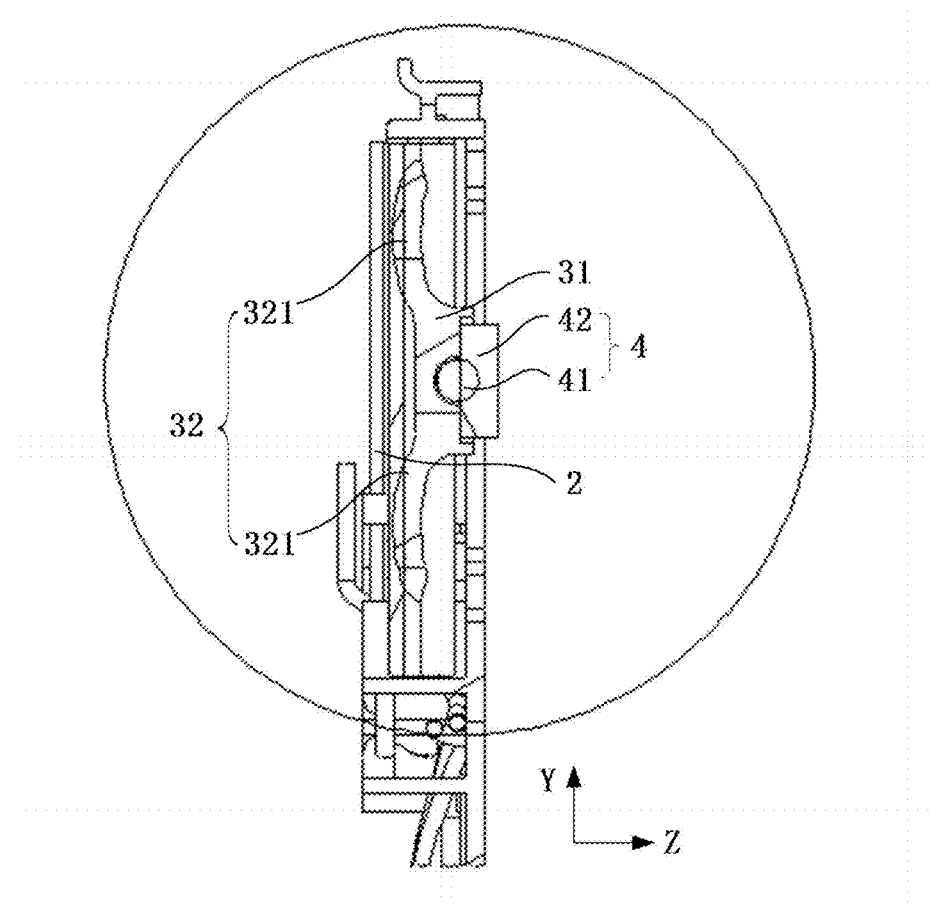
FIG. 10 is a schematic cross-sectional view of FIG. 9 at F-F.
Figure 11:
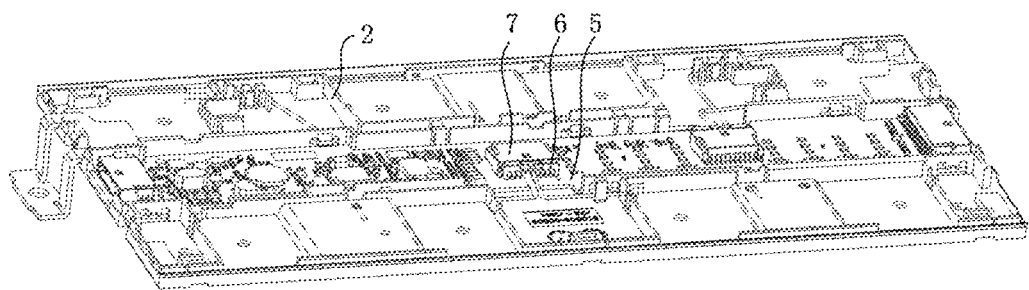
FIG. 11 is another three-dimensional structure diagram of the wire harness plate of the battery module provided by an embodiment of the present application.
Figure 12:
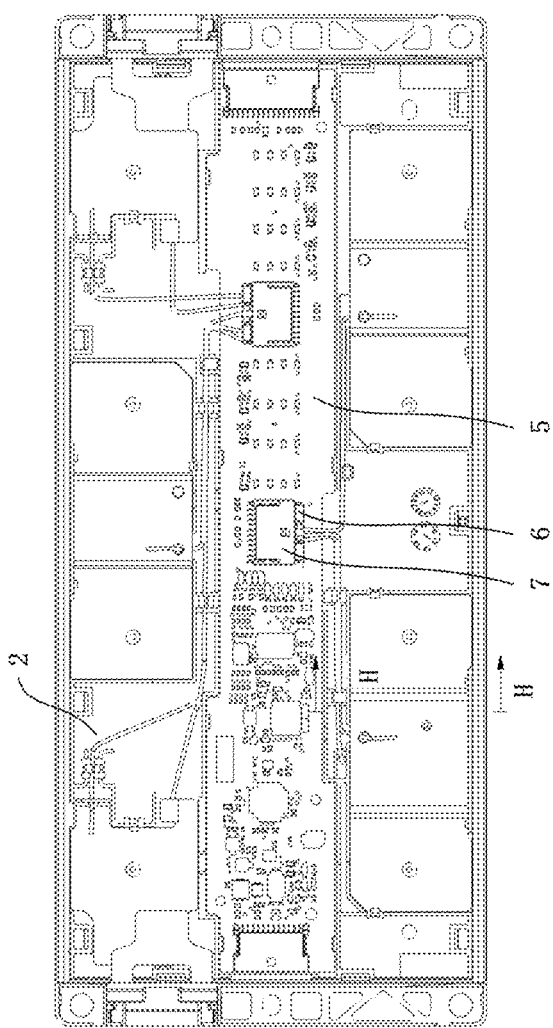
FIG. 12 is a schematic diagram of the three-dimensional structure of the wire harness plate of the battery module provided by an embodiment of the present application with one side of the connecting piece.

Referring to FIGS. 5 and 10, as described above, the connecting piece 2 tightens the cantilever 321 of the elastic pressing part 32, so that the temperature collecting component 4 is clamped between the installation part 31 and the top cover 12. The connecting piece 2 applies pressure to the cantilever 321, and since the cantilever 321 is integrated with the installation part 31, the cantilever 321 transfers the pressure to the mounting section 31, so that the heat conduction pad 42 of the temperature collecting component 4 is in close contact with the top cover 12, so that the temperature of the top cover 12 can be transferred to the thermistor 41 via the heat conduction pad 42.

Referring to FIG. 5, in some embodiments, the cantilever 321 is constructed for whole arc bending, or a part of which is constructed for arc bending. The radian and length of the arc bending are related to the pressure on the cantilever 321 after installation. The cantilever 321 adopts the above structure, which is stable and reliable. During installation and use, the cantilever 321 can form an effective supporting force to ensure that the connecting piece 2 is in pressure contact with the elastic pressing part 32, so that the connecting piece 2 and the battery 1 are tightly matched.

In some embodiments, the cantilever 321 is formed into an arc-shaped curved structure, such as by injection molding, so that when the connecting piece 2 presses the elastic pressing part 32, the elastic pressing part 32 releases the pressure through elastic deformation. The elastic deformation also increases the strength of the elastic pressing portion 32, and prevents the thermistor 41 from being damaged by excessive pressure.

According to the technical solution provided by the above embodiment, the height L1 of the cantilever 321 is larger than the height L2 of the installation part 31, and the connecting piece 2 is in pressure contact with the cantilever 321. That is, the connecting piece 2 is in pressure contact with the elastic pressing part 32. Since the elastic pressing part 32 is integrated with the installation part 31, the installation part 31 is also pressed by the connecting piece 2, the pressure of the installation part 31 is transferred to the thermistor 41, and then to the thermal pad 42 which is in close contact with the thermistor 41 so that the thermal pad 42 is in close contact with the top cover 12. Furthermore, it can be seen from the above analysis that the cantilever 321 is not in contact with the top cover 12, and the connecting piece 2 is not in contact with the mounting part 31, so that the temperature of the connecting piece 2 is prevented from being transferred to the thermistor 41 of the temperature collecting component 49, so that the temperature collected by the thermistor 41 is not affected by the temperature of the connecting piece 2, ensuring that the temperature collected by the thermistor 41 is the temperature of the top cover 12 and ensuring the accuracy of temperature collection.

Referring to FIGS. 2 to 5, in some embodiments, there are two cantilevers 321, and the two cantilevers 321 are symmetrically arranged with respect to the center line L3 in the width direction Y of the installation part 31.

The two cantilevers 321 form a multi-point support when the elastic pressing part 32 comes into contact with the connecting piece 2 in the subsequent, and the support position is uniformly distributed on both sides of the center line L3 of the width direction Y of the installation part 31. The two cantilevers 321, for example, adopt the same structure and have the same size parameters. Then, when the connecting piece 2 presses the two cantilevers 321, the forces on the two cantilevers 321 are completely the same in theory. Since the installation part 31 is located between the two cantilevers 321, and the structure of the installation part 31 itself is symmetrical with respect to the center line L3 in the width direction Y of the installation part 31, the forces on both sides of the center line L3 of the installation part 31 are relatively balanced, so that the force acting on the thermistor 41 (specifically, the water dropper head of the thermistor 41) pressed by the installation part 31 is also balanced. The force of the heat conduction pad 42 which is in close contact with the thermistor 41 is also balanced, therefore, when the heat-conducting pad 42 and the top cover 12 are tightly bonded, the bonding tightness of each part is relatively consistent, then the temperature transfer of each part of the heat conduction pad 42 is more accurate. Finally, the temperature collection of the thermistor 41 is accurate and reliable.

The following will describe how to realize the installation of the head and wire of the thermistor 41 of the temperature collecting component 4.

Figure 8:
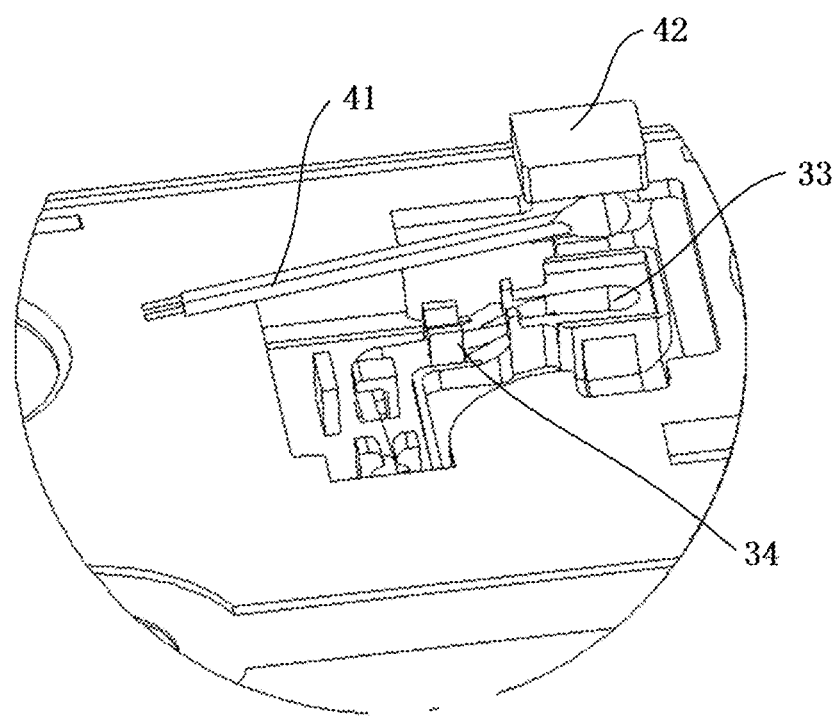
FIG. 8 is a schematic diagram of the local magnification of FIG. 7 at D.
Figure 9:
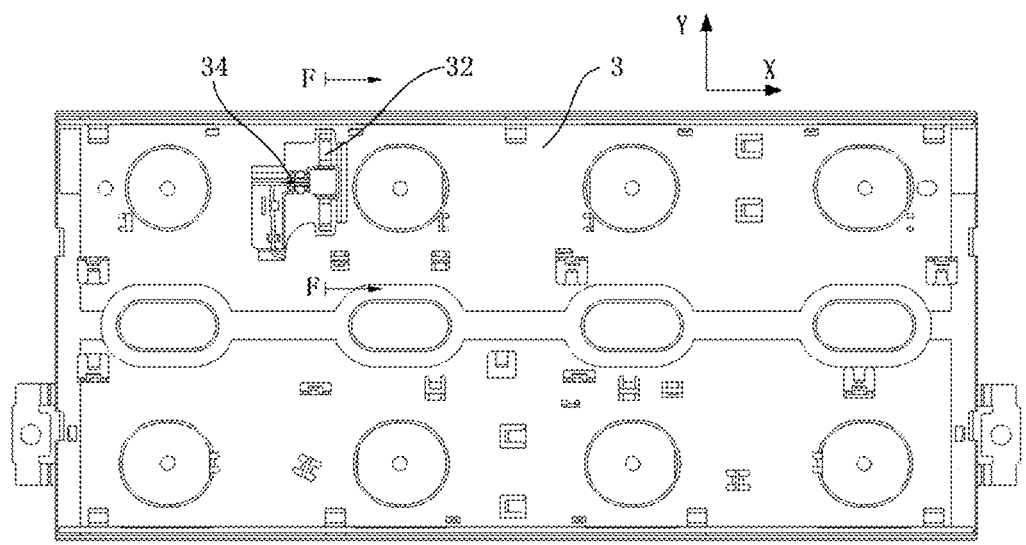
FIG. 9 is a schematic structure diagram of the wire harness plate of the battery module provided by an embodiment of the present application with one side of the temperature collecting component.

Referring to FIGS. 5 and 8, in some embodiments, the installation part 31 is provided with an installation slot 33 and a buckle structure 34, one end of the thermistor 41 is installed in the installation slot 33, and the other end of the thermistor 41 is fixed by the buckle structure 34.

As described above, the thermistor 41 includes a head and a wire, both of which are electrically connected. The head of the thermistor 41 is installed in the installation slot 33, and one side of the wire of the thermistor 41 close to the head is fixed by the buckle structure 34. The buckle structure 34 has, for example, an opening slot in which the wire is inserted and fixed by the side wall of the opening slot.

According to the technical solution provided by the above embodiment, the thermistor 41 is firmly installed on the installation part 31 through the installation groove slot 33 and the buckle structure 34, and the head and wire of the thermistor 41 are not easy to shift or loose when the battery module is working in bad working conditions, so the accuracy and reliability of collecting temperature are improved.

Figure 14:
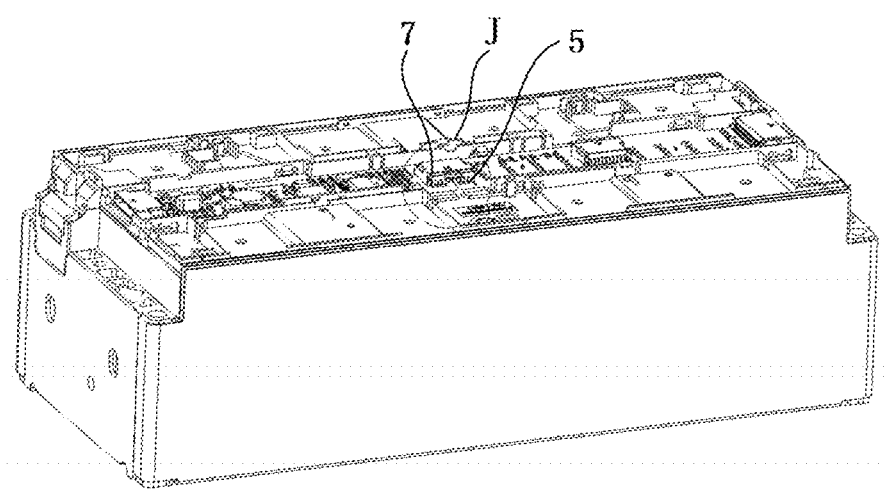
FIG. 14 is another three-dimensional structure diagram of the battery module provided by an embodiment of the present application.
Figure 15:
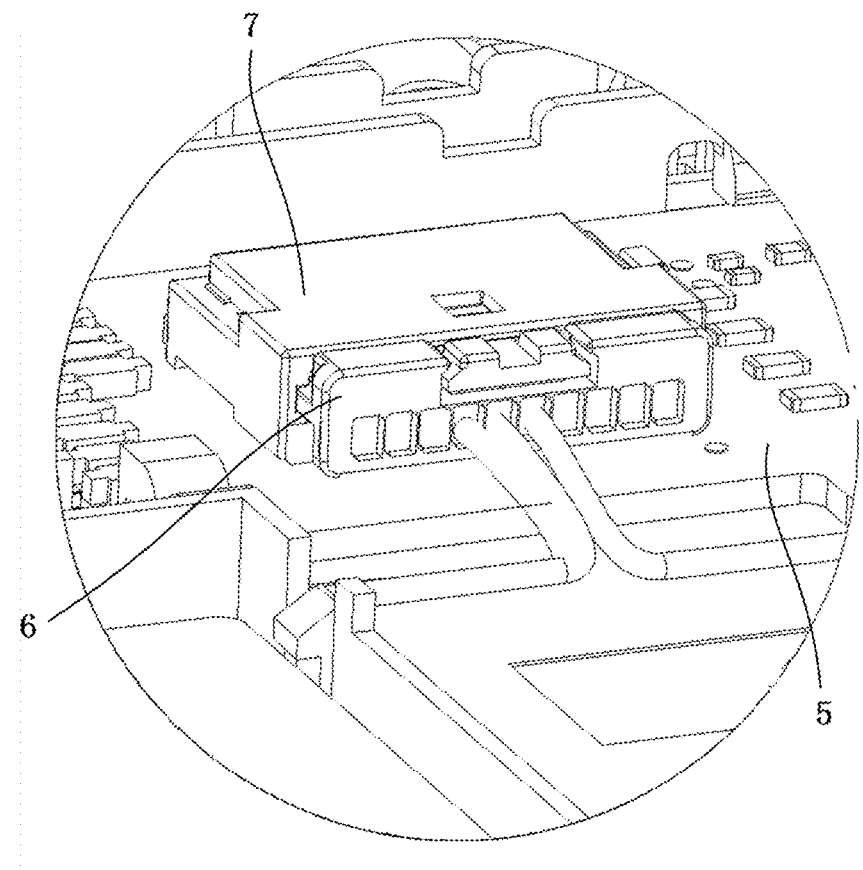
FIG. 15 is a schematic diagram of the local magnification of FIG. 14 at J.

Referring to FIGS. 14 and 15, in some embodiments, the battery module also includes a circuit board 5, arranged on the wire harness plate 3. The thermistor 41 electrically connected with the circuit board 5, to transfer the temperature signal collected by the thermistor 41 to the circuit board 5

The circuit board 5 can be PCB board (Printed Circuit Board) or FPC board (Flexible Printed Circuit Board), PCB board has higher stiffness and hardness, while FPC board has higher flexibility and lower hardness.

In some embodiments, optionally, the circuit board 5 is a PCB board.

The thermistor 41 and the circuit board 5 are electrically connected in the following way.

In some embodiments, the thermistor 41 is connected to the connector plug 6, the circuit board 5 is provided with a connector socket 7. The connector plug 6 is plugged into the connector socket 7, so that the thermistor 41 is electrically connected to the circuit board 5.

Specifically, one end of the wire of the thermistor 41 away from the head is electrically connected with the connector plug 6. Both the connector plug 6 and the connector socket 7 can adopt existing products.

By using the above connection mode, the electrical connection between the thermistor 4 and the circuit board 5 is easily realized, and the electrical connection is reliable, and the installation is simple and efficient.

The specific installation method of the heat conduction pad 42 will be described below.

Referring to FIG. 5, in some embodiments, the installation part 31 is provided a positioning slot 35, communicated with the installation slot 33, and the heat conduction pad 42 is arranged in the positioning slot 35. The positioning slot 35 is located on one side of the installation slot 33 facing the top cover 12. The positioning slot 35 may be square or circular.

The positioning slot 35 has a certain depth, and the positioning slot 35 is used for placing the heat conduction pad 42. The opening size of the positioning slot 35 is larger than the opening size (or diameter) of the installation slot 33, and the size of the heat conduction pad 42 matches the opening size of the positioning slot 35, so the size of the heat conduction pad 42 is relatively large, and the heat conduction pad 42 can be in full contact with the thermistor 41. At the same time, the side wall of the positioning slot 35 limits the position of the heat conduction pad 42, limits the displacement of the heat conduction pad 42 in the X and Y directions in the plane, prevents the displacement of the heat conduction pad 42 under adverse working conditions, and further preventing the thermistor 41 from being unable to accurately collect the temperature.

As can be seen from the above description, the installation part 31 is provided with an installation slot 33 and a positioning slot 35, the head of the thermistor 41 is placed in the installation slot 33, and a heat conduction pad 42 is arranged in the positioning slot 35. The groove wall of the positioning slot 35 provides position limit of the heat conduction pad 42 in the plane, that is, the position limit in the X and Y directions. The installation part 31 is tightly pressed by the connecting piece 2 via the elastic pressing part 32, and the position limit of Z direction of the heat conduction pad 42 is provided by the pressing of the connecting piece 2, so that the temperature collecting component 4 can be installed firmly. Moreover, the installation part 31 does not contact the connecting piece 2, which prevents the temperature of the connecting piece 2 from being transferred to the thermistor 41 and affects the accuracy of temperature acquisition.

Figure 6:
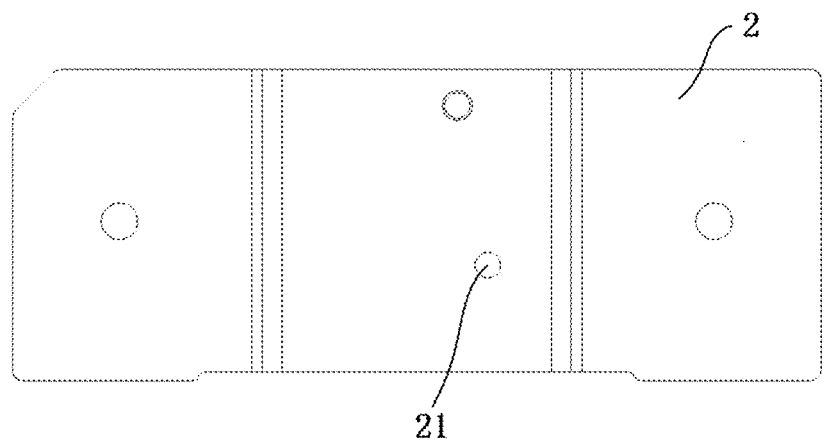
FIG. 6 is a schematic diagram of the structure of the connecting piece of the battery module provided by an embodiment of the present application.
Figure 7:
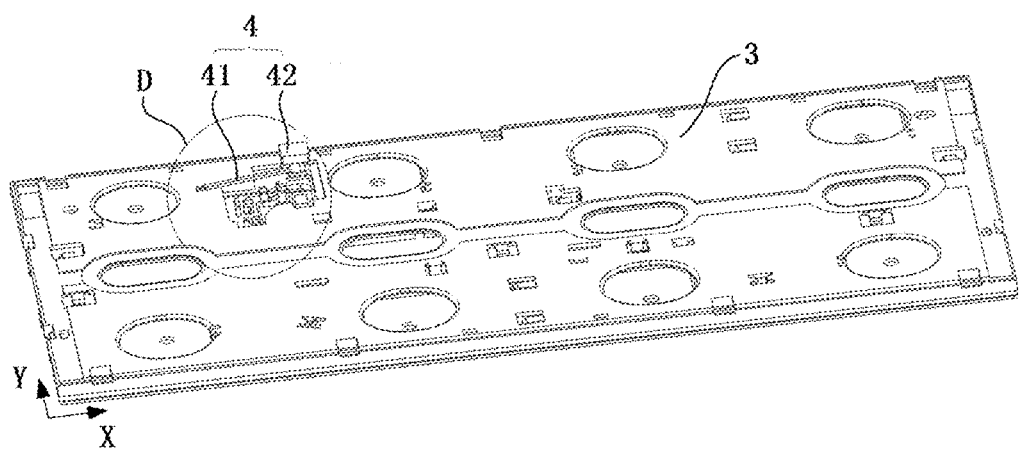
FIG. 7 is a schematic diagram of the three-dimensional structure of the wire harness plate of the battery module provided by an embodiment of the present application with one side of the temperature collecting component.

Referring to FIG. 1, FIG. 4 and FIG. 6, in some embodiments, the installation slot 33 is provided with a gap 36, and the connecting piece 2 is correspondingly provided with an observation hole to observe whether the heat conducting pad 42 is installed in place through the gap 36.

The gap 36 in the lower part of the installation part 31 makes at least part of the assembled heat conduction pad 42 exposed, to realize the detection of the position of the heat conduction pad 42.

Figure 13:
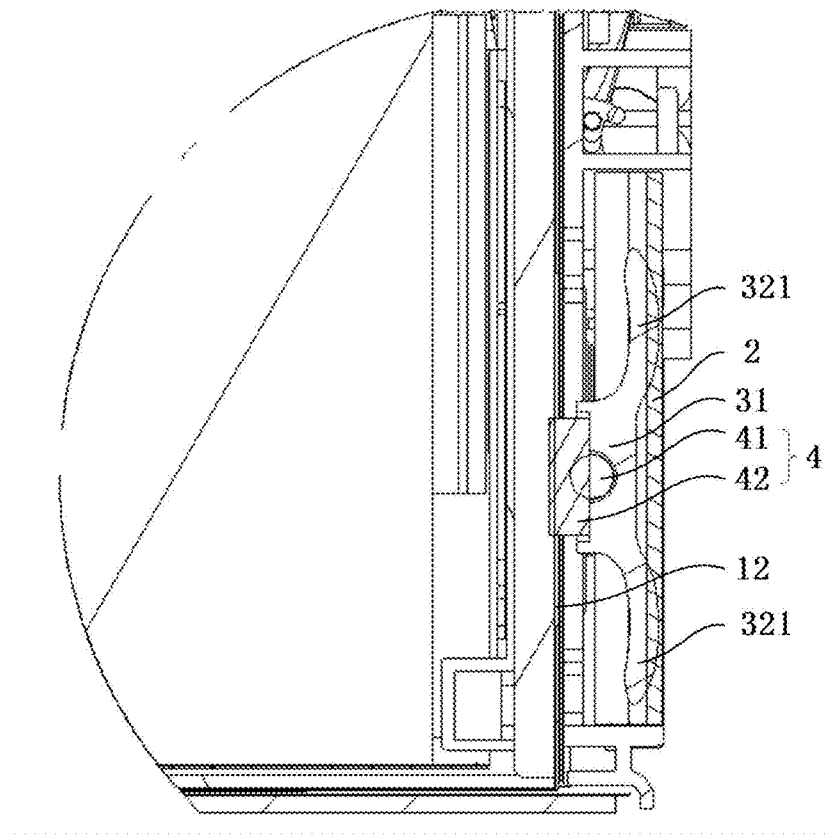
FIG. 13 is a schematic cross-sectional view of FIG. 12 at H-H.

Referring to FIGS. 13 to 15, the installation process of the temperature collecting component 4 described above will introduced below.

After the battery module is assembled to the semi-finished product, the thermistor 41 and the heat conduction pad 42 are mounted on the installation part 31. The thickness of the heat conduction pad 42 in the original state (uncompressed state) should be greater than the gap between the head of the thermistor 41 and the top cover 12, Then, the connecting piece 2 is placed in the corresponding position of the wire harness plate 3, and the connecting piece 2 is welded with the electrode terminal 11 of the battery 1.

After welding between the connecting piece 2 and the electrode terminal 11, the connecting piece 2 presses the cantilever 321 of the elastic pressing part 32, then the installation part 31 presses the heat conduction pad 42 so that the heat conduction pad 42 is attached to the top cover 12 and forms close contact with the top cover 12, the reliability of heat transfer between the top cover 12 and the thermistor 41 could be ensured.

Finally, the circuit board 5 is installed on the wire harness plate 3, and the connector plug 6 connected with the thermistor 41 is plugged into the connector socket 7 on the circuit board 5, so that the thermistor 41 is electrically connected with the circuit board 5, and then the temperature signal of the top cover 12 collected by the thermistor 41 can be transferred to the circuit board 5.

According to the battery module provided by the above technical solution, the temperature of the top cover 12 is transferred to the thermistor 41 of the temperature collecting component 4 through a short transfer path, which has the advantages of fast temperature transfer response, small temperature loss and accurate measurement. Moreover, the temperature of the top cover 12 near the negative electrode terminal 112 is basically consistent with the internal temperature of the battery 1, the temperature collected by the thermistor 41 basically accurately reflects the internal temperature of the battery 1. In addition, the above-mentioned temperature transfer path is short, and the internal temperature change of the battery 1 can also be timely reflected as the temperature change of the top cover 12, thus making the temperature collected by the thermistor 41 change in time, providing accurate temperature data for the processing of the circuit board 5, making the control more accurate, effectively reducing or even preventing the battery module from limiting the discharge power in advance.

The embodiment of the present application also provides an apparatus, which includes a battery module described in the above embodiment, and the battery module is used for providing electric energy. Among them, the apparatus can be a vehicle or an energy storage apparatus.

In the description of the present application, it should be understood that the orientation or position relationship of the terms "center", "longitudinal", "lateral", "front", "back", "left", "right", "vertical", "horizontal", "top", "bottom", "inside", "outside" etc. are based on the orientation or position relationship shown in the attached drawings, and are only for the convenience of describing the present application and simplifying the description, rather than indicating or implying that the apparatus or element referred to must have a specific orientation, constructed and operated for a specific orientation, and therefore cannot be understood as a limitation on the protection content of the present application.

Finally, it should be noted that the above embodiments are only used to illustrate the technical solution of the present application, but not to limit it. Although the present application is explained in detail with reference to the above-mentioned embodiments, ordinary technicians in the art should understand that the technical solutions described in the above-mentioned embodiments can still be modified or some of the technical features can be equivalently replaced, but these modifications or replacements do not make the essence of the corresponding technical solutions deviate from the spirit and scope of the technical solutions of the various embodiments of the present application.

What is claimed is:

1. A battery module, comprising:
   a battery comprising an electrode terminal and a top cover;
   a connecting piece fixed with the electrode terminal;
   a wire harness plate arranged on the top outside of the top cover, and provided with an installation part and an elastic pressing part; and
   a temperature collecting component installed on the installation part and located between the wire harness plate and the top cover; wherein the elastic pressing part is butted with the connecting piece, and the temperature collecting component is butted with the top cover; wherein the temperature collecting component comprises a thermistor and a heat conduction pad, the thermistor is interposed between the installation part and the heat conduction pad, the heat conduction pad is located between the thermistor and the top cover, and the installation part presses the thermistor and the heat conduction pad for enabling the thermistor to form close contact with the heat conduction pad and the heat conduction pad to be butted with the top cover; wherein the installation part is provided with an installation slot and a buckle structure, one end of the thermistor is installed in the installation slot, and the other end of the thermistor is fixed by the buckle structure; and wherein the installation part is provided with a positioning slot, the positioning slot is communicated with the installation slot and is located outside of the installation slot, and the heat conduction pad is installed in the positioning slot,
   wherein the elastic pressing part comprises a cantilever, the cantilever extends toward both sides of the installation part, and L1 is greater than L2; wherein L1 is the maximum distance between the surface of the cantilever on the side away from the top cover and the surface of the top cover on the side facing the installation part, and L2 is the maximum distance between the surface of the installation part on the side away from one side of the top cover and the surface of the top cover on the side facing the installation part.

2. The battery module according to claim 1, wherein the cantilever is constructed for whole arc bending.

3. The battery module according to claim 1, wherein there are two cantilevers, and the two cantilevers are symmetrically arranged with respect to a center line in a width direction of the installation part.

4. The battery module according to claim 1, wherein the connecting piece is configured to press the cantilever of the elastic pressing part, so that the temperature collecting component is clamped between the installation part and the top cover.

5. The battery module according to claim 1, wherein the battery module further comprises a circuit board, the circuit board is arranged on the wire harness plate, and the thermistor is electrically connected with the circuit board.

6. The battery module according to claim 5, wherein the thermistor is connected to a connector plug, the circuit board is provided with a connector socket, the connector plug is plugged with the connector socket so that the thermistor is electrically connected to the circuit board.

7. The battery module according to claim 1, wherein the temperature collecting component is arranged adjacent to the negative electrode terminal of the battery.

8. An apparatus, comprising a battery module configured to provide electrical energy, the battery module comprising:
a battery comprising an electrode terminal and a top cover;
a connecting piece fixed with the electrode terminal;
a wire harness plate arranged on the top outside of the top cover, and provided with an installation part and an elastic pressing part; and
a temperature collecting component installed on the installation part, and located between the wire harness plate and the top cover; wherein the elastic pressing part is butted with the connecting piece, and the temperature collecting component is butted with the top cover; wherein the temperature collecting component comprises a thermistor and a heat conduction pad, the thermistor is interposed between the installation part and the heat conduction pad, the heat conduction pad is located between the thermistor and the top cover, the installation part presses the thermistor and the heat conduction pad for enabling the thermistor to form close contact with the heat conduction pad and the heat conduction pad to be butted with the top cover wherein the installation part is provided with an installation slot and a buckle structure, one end of the thermistor is installed in the installation slot, and the other end of the thermistor is fixed by the buckle structure; and wherein the installation part is provided with a positioning slot, the positioning slot is communicated with the installation slot and is located outside of the installation slot, and the heat conduction pad is installed in the positioning slot,
wherein the elastic pressing part comprises a cantilever, the cantilever extends toward both sides of the installation part, and L1 is greater than L2; wherein L1 is the maximum distance between the surface of the cantilever on the side away from the top cover and the surface of the top cover on the side facing the installation part, and L2 is the maximum distance between the surface of the installation part on the side away from one side of the top cover and the surface of the top cover on the side facing the installation part.

9. The apparatus according to claim 8, wherein the cantilever is constructed for whole arc bending.

10. The apparatus according to claim 8, wherein there are two cantilevers, and the two cantilevers are symmetrically arranged with respect to a center line in a width direction of the installation part.

11. The apparatus according to claim 8, wherein the connecting piece is configured to press the cantilever of the elastic pressing part so that the temperature collecting component is clamped between the installation part and the top cover.

12. The apparatus according to claim 8, wherein the battery module further comprises a circuit board, the circuit board is arranged on the wire harness plate, and the thermistor is electrically connected with the circuit board.

* * * * *